(12) United States Patent
Verbrugge et al.

(10) Patent No.: US 10,849,458 B2
(45) Date of Patent: Dec. 1, 2020

(54) PORTABLE BARBECUE

(71) Applicant: Mohammad Charif Soubra, WT Amsterdam (NL)

(72) Inventors: Jeroen Klaasjan Verbrugge, VJ Hoek Van Holland (NL); Willemijn Lianne Verduijn, XB Rotterdam (NL); John William Spaven, EH Delft (NL)

(73) Assignee: Mohammad Charif Soubra, WT Amsterdam (NL)

( * ) Notice: Subject to any disclaimer, the term of this patent is extended or adjusted under 35 U.S.C. 154(b) by 92 days.

(21) Appl. No.: 16/329,602

(22) PCT Filed: Aug. 31, 2017

(86) PCT No.: PCT/NL2017/050576
§ 371 (c)(1),
(2) Date: Feb. 28, 2019

(87) PCT Pub. No.: WO2018/044168
PCT Pub. Date: Mar. 8, 2018

(65) Prior Publication Data
US 2019/0191929 A1    Jun. 27, 2019

(30) Foreign Application Priority Data

Sep. 1, 2016  (NL) ........................ 2017404

(51) Int. Cl.
*A47J 37/07*  (2006.01)

(52) U.S. Cl.
CPC .... *A47J 37/0763* (2013.01); *A47J 2037/0777* (2013.01)

(58) Field of Classification Search
CPC ...................... A47J 37/0763; A47J 2037/0777
See application file for complete search history.

(56) References Cited

U.S. PATENT DOCUMENTS 1,540,434 A * 6/1925 Stone ...................... F24B 1/205
126/9 R
2,477,529 A * 7/1949 Sprinkle ............. A47J 37/0763
126/25 R (Continued)

FOREIGN PATENT DOCUMENTS

DE        20306625 U1    8/2003
DE     202009004311 U1    8/2010

(Continued)

OTHER PUBLICATIONS

International Search Report and Written Opinion for PCT/NL2017/051032, dated Nov. 30, 2017, 10 pages.

*Primary Examiner* — David J Laux
(74) *Attorney, Agent, or Firm* — Blank Rome LLP

(57) ABSTRACT

The invention relates to a portable barbecue, said portable barbecue comprising a firebox (2), a grate (3) and a cover (4). With a barbecue (1) according to the invention the firebox and the cover are adapted to be coupled in a portable configuration, in which the cover functions as a cover of the firebox, and in a barbecue configuration, in which the cover functions as a stand of the firebox that vertically spaces the firebox at a distance from a support surface. This design of the barbecue, more in particular the cover of the barbecue, allows for an efficient use of components, and, since the firebox is simply placed on the cover, this is achieved without the requirement of complicated hinge connections.

20 Claims, 3 Drawing Sheets

(56) References Cited

U.S. PATENT DOCUMENTS

Figure 1:
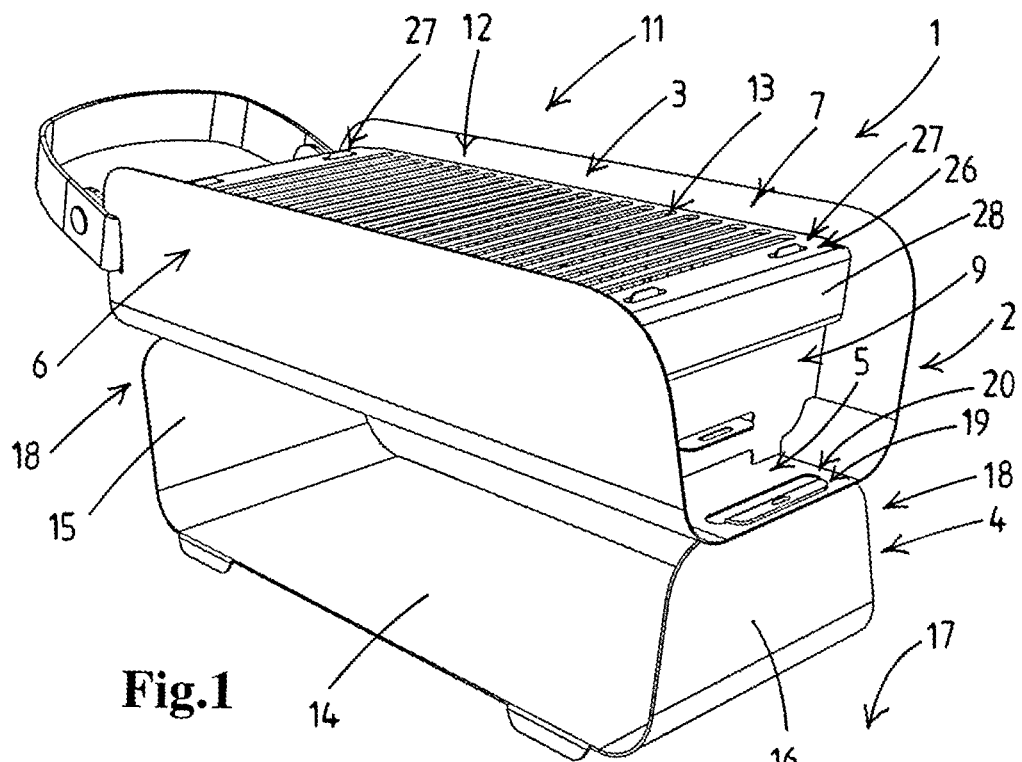

| | | | | |
|---|---|---|---|---|
| 3,266,483 A | * | 8/1966 | Keel | A47J 37/0763 126/275 R |
| 4,471,749 A | * | 9/1984 | Galdes | A47J 37/0763 126/25 R |
| 5,782,168 A | * | 7/1998 | Krhnak | A47J 37/0745 126/25 R |
| 5,970,971 A | * | 10/1999 | Wu | A47J 37/0763 126/25 R |
| 7,237,548 B2 | * | 7/2007 | Mizrahi | A47J 37/0704 126/25 R |
| 8,752,539 B2 | * | 6/2014 | Paap | A47J 37/0704 126/25 R |
| 9,027,543 B2 | * | 5/2015 | Robb | A47J 37/0763 126/25 R |
| 2013/0167738 A1 | * | 7/2013 | Rochefort | A47J 37/0727 99/449 |
| 2013/0312737 A1 | * | 11/2013 | Chung | A47J 33/00 126/9 B |
| 2014/0116265 A1 | * | 5/2014 | Samaras | A47J 37/0704 99/445 |

FOREIGN PATENT DOCUMENTS

| | | |
|---|---|---|
| GB | 2461402 A | 1/2010 |
| WO | WO-2010/000111 A1 | 1/2010 |

* cited by examiner

PORTABLE BARBECUE

RELATED APPLICATIONS

This application is a national phase of PCT/NL2017/050576, filed on Aug. 31, 2017, which claims the benefit of The Netherlands Patent Application No. 2017404, filed on Sep. 1, 2016. The entire contents of these applications are hereby incorporated by reference.

Portable barbecue grills have long been popular for camping and picnicking. Such portable barbecues are different from the barbecues used for backyard or patio cooking in that they must be light weight and easy to assemble and disassemble.

Portable barbecues are known in the prior art, for example from U.S. Pat. Nos. 1,540,434 and 2,477,529. These portable barbecues typically have a suitcase like configuration to enable them to be carried with ease. The barbecues are folded between a portable configuration and a barbecue configuration. All in all the known portable barbecues are of a complicated design, comprising many components which are to be hingeable connected during assembly. Thus, they require an expensive and lengthy production process.

It is an object of a first aspect of the invention to provide an alternative, portable barbecue in which the above mentioned drawbacks are eliminated altogether or occur in a greatly reduced extent.

In particular it is an object of the first aspect of the invention to provide an alternative, portable barbecue which can be quickly and easily disassembled into a compact unit for carrying and storing and can be as quickly and easily set up for use.

It is a further object of the present invention to provide a portable barbecue which allows for a simple production process, and is thus inexpensive to manufacture.

It is a further object of the present invention to provide a portable barbecue wherein the user may assemble and disassemble the various components without the need of any tools or separate fasteners.

According to the present invention, this object is achieved by providing a barbecue according to claim 1.

A portable barbecue according to the invention comprises:
a firebox for holding embers, a grate for supporting food products to be barbecued above the embers, and a cover for said firebox,
wherein the firebox has a bottom panel, a front panel, a rear panel, a left side panel and a right side panel, which panels together form the firebox, the firebox having an open top,
wherein the grate has a food product support surface, which support surface is provided with a pattern of apertures, and which grate is configured to be mounted over the open top of the firebox,
wherein the cover has a top panel, a left side panel and a right side panel, which side panels are provided at opposite ends of the top panel, such that the cover is substantially U-shaped in a frontal view, and which left side panel and right side panel are spaced for receiving the firebox between them,
wherein the firebox and the cover are adapted to be coupled in a portable configuration, in which the cover functions as a cover of the firebox, and in a barbecue configuration, in which the cover functions as a stand of the firebox,
in which portable configuration the cover is mounted onto the firebox such that the top panel of the cover covers the open top of the firebox, and the left panel and the right side panel of the cover extend along the left panel and the right panel of the firebox, and
in which barbeque configuration, the firebox is mounted onto the cover, such that the cover forms a stand for the firebox, and the left side panel and the right side panel of the cover vertically space the firebox at a distance from a support surface.

With a barbecue according to the invention the firebox and the cover are adapted to be coupled in a portable configuration, in which the cover functions as a cover of the firebox, and in a barbecue configuration, in which the cover functions as a stand of the firebox that vertically spaces the firebox at a distance from a support surface. This design of the barbecue, more in particular the cover of the barbecue, allows for an efficient use of components, and, since the firebox is simply placed on the cover, this is achieved without the requirement of complicated hinge connections.

Thus, the invention provides a portable barbecue having a simple design with few components and a simple construction. The barbecue according to the invention thus allows for an inexpensive and comparatively short production process.

Furthermore, to switch between the portable configuration and the barbecue configuration, the firebox is to be mounted onto the cover, which cover functions as a stand for said firebox. The barbecue can be assembled and disassembled without the need of tools, and is thus easy to use. The invention furthermore provides a portable barbecue which can be quickly and easily disassembled into a compact unit for carrying and storing and can be as quickly and easily set up for use.

It is noted that according to the invention, the cover is provided with two side panels, which side panels are provided on opposite sides of the top panel of the cover. Thus, the front and the back of the cover are open. In the barbeque configuration, the firebox is mounted onto the cover, such that the cover forms a stand for the firebox, and the left side panel and the right side panel of the cover vertically space the firebox at a distance from a support surface. By spacing the firebox relative to the support surface, e.g. the table top of a picnic table, the cover prevents the support surface from getting burned by the heat radiated by the firebox when used.

Furthermore, the open front and back of the cover allow for air to freely pass below the firebox, and thus allow for venting the support surface as the well as the firebox, and thus furthermore reduce the chance of the support surface getting burned.

It is submitted that in a preferred embodiment, the cover is a simple U-shaped profile, comprising a flat top surface and two side panels. The side panels may be simple rectangular panels.

Furthermore, the side panels and the top panel of the cover may be provided with openings, for example a grid of openings providing a grate like appearance, and/or the side panels may be provided with recesses, for example providing the side panels with an N-shape, or an M-shape, without going beyond the scope of the invention. Such openings may further enhance ventilation of the firebox and of the support surface during use of the barbecue.

Also, in an embodiment, additional supports may be provided along the front side and back side of the cover, be it that the panels would not fully extend along the sides, front and rear of the cover, since the box like structure that would thus be crated would prevent proper ventilation below the firebox and/or along the support surface during use of the barbecue.

In yet another embodiment, additional supports may be provided at the side of the top panel of the cover that faces the support surface when the cover is in the barbecue configuration. In a further embodiment, these additional supports are located away from the edge of the cover, and are received within the firebox when the cover is coupled with the firebox in in the portable configuration.

It is submitted that the cover according to the invention functions as a stand for positioning the fire box at a significant distance from a support surface, i.e. at a distance that allows for air to freely circulate below the firebox and at a distance the prevents the heat radiation of the firebox to burn the support surface.

In an embodiment the side panels of the cover are dimensioned such that the cover functions as a stand, positioning the box at a distance from the supporting surface of at least 3 cm, preferably at least 4 cm, for example 5 cm.

It is noted that in addition to the spacing provided by the cover, the top panel of the cover provides an additional protection against heat radiating from the firebox and that deflects that heat away from the support surface.

In an embodiment of a barbecue according to the invention, the left side panel and right side panel of the cover are provided with free ends that are configured to, in the barbeque configuration, be coupled with the firebox, preferably with the bottom panel of the firebox, such that in the barbecue configuration the side panels of the cover space the bottom panel of the firebox at a distance from the top panel of the cover.

In such an embodiment, the top panel of the cover thus forms a base of the stand provided by the cover. This is beneficial, since the space between the bottom panel of the firebox and the top panel of the cover allows for air to flow directly along the bottom side of the firebox, and thus optimally cool said bottom surface, and in turn prevent the support surface and/or the top panel of the cover to get burned by heat radiated form the firebox during use.

In a preferred embodiment the firebox and the cover are configured such that the free ends of the side panels are coupled with the bottom panel of the firebox, to provide a maximum spacing between the bottom panel of the firebox and the top panel of the cover, when in the barbecue configuration.

In an alternative embodiment, the firebox and the cover are configured such that the free ends of the side panels are coupled with the side panels of the firebox, for example are provided with tabs that are to be inserted into slots provided in the side panels of the firebox. Such an embodiment would allow for the free ends of the side panels to be coupled with the firebox and different positions, for example by providing multiple slots, one above the other, in each side panel of the firebox, to thus enable the spacing between the top panel of the cover and the bottom panel of the firebox to the adjusted.

In an alternative embodiment the cover is configured for supporting the firebox on top of its top panel, the side panels having free ends configured as feet that support the cover, and thus the firebox mounted on top of that cover, on a support surface. In such an embodiment the top panel of the cover can be provided with apertures and/or with spacers, to allow air to flow directly along the bottom panel of the firebox.

As was already set out above, in a preferred embodiment of a barbecue according to the invention, in the barbecue configuration the cover is placed upon a support surface with its top panel facing the support surface and its side panels extending upwards. In such an embodiment the left side panel and right side panel of the cover are provided with free ends that are configured to, in the barbeque configuration, be coupled with the firebox, preferably with the bottom panel of the firebox, such that in the barbecue configuration the side panels of the cover space the bottom panel of the firebox at a distance from the top panel of the cover.

Furthermore, in such an embodiment, the space between the bottom panel of the firebox and the top panel of the cover allows for air to flow directly along the bottom side of the firebox, and thus optimally cool the bottom surface of the firebox. At the same time, the top panel of the cover also functions as a heat shield that shields the support surface from heat radiated by the firebox. This is in particular beneficial when the barbecue is used as a table top barbecue.

In a further preferred embodiment of a barbecue according to the invention, the cover is provided with feet, preferably in the form of tabs extending along the front and rear of top panel which tabs are folded at an angle relative to the top panel, for spacing the top panel of the cover relative to the support surface when the cover supports the firebox in the barbecue configuration.

In an alternative embodiment, in addition to, or instead of, the feet in the form of tabs, other type of feet can be provided as well. For example, the top panel can be provided with multiple protrusions or projections, for example in the form of plastic domes attached, e.g. glued or screwed onto the top panel, to function as feet that space the top panel form the support surface. These protrusions preferably are made form an heat insulating material.

In an embodiment, the feet are provided in the form of tabs as set out above, and are provided with sleeves of insulating material to further enhance the insolating properties of the feet.

Providing the cover with feet sets the top panel apart from the support surface, and thus provides an additional layer of insulation between the heat radiated by the firebox and the support surface onto which the barbecue has been set up. Furthermore, the feet reduce the contact surface of the cover, c.q. the barbecue, with the support surface, and thus reduces heat transfer between barbecue and support surfaces as well.

Thus, the cover can be provided with a substantially flat top panel and still provide a solid base for the firebox. It is noted that when the cover would be provided with a fat top surface only and the barbecue would be set up on a flat surface, such as a table top, irregularities caught between support surface and cover might cause the an unstable support. By providing the cover with feet, the risk of an unstable base due to irregularities on a support surface is reduced. Such an embodiment is in particular beneficial when the portable barbecue is to be used as a table top barbecue.

In a further embodiment, the front panel and the rear panel of the firebox are dimensioned such that, in the portable configuration, they extend above the top panel of the cover, preferably to such an extent that they extend up to or beyond the feet provided on the top cover. Thus, they prevent the feet from forming protrusions that extend beyond the contour of the barbecue, which protrusions may hook into foreign bodies or scratch surfaces during transport of the barbecue or when the barbecue is being stored.

In an embodiment of a barbecue according to the invention, the cover is configured to, in the portable configuration, be coupled with the firebox at the free ends of its left side panel and right side panel. Thus, a coupling device provided at the free ends of the side panels that is used to couple the cover with the firebox when in the barbecue configuration, is also used for coupling the cover with the firebox when in the portable configuration. Thus, the design of the cover can be kept simple. In yet a further embodiment the coupling devices provided on the firebox, for cooperation with the coupling devices provided at the free ends of the side panels of the cover, are also used in both the portable configuration and the barbecue configuration for coupling the cover with the firebox.

In an embodiment of a barbecue according to the invention, the firebox and the left side panel and the right side panel of the cover are provided with coupling devices in the form of a tab in slot connection which, in the barbeque configuration, and preferably also in the portable configuration, couples the cover with the firebox. Such an embodiment is in particular beneficial when the cover and the firebox are formed out of sheet metal, since the coupling devices can then be created in a simple and efficient manner during the production process by stamping and bending the sheet metal into the correct configuration.

In an alternative embodiment the side panels are provided with pins near the free ends of the side panels, which pins are to be inserted in apertures provided in the side panels of the firebox, or vice versa.

In a further embodiment of a barbecue according to the invention, the left side panel and the right side panel are embodied as resilient side panels, which resilient side panels need to be pushed away from each other or need to be pushed towards each other to position the taps into the slots and thus couple the cover with the firebox, and which resiliently bias the tab in the slot once the cover is coupled with the firebox.

By thus providing the cover with flexible side panels, the barbecue is provided with simple and reliable coupling devices for coupling the cover with the firebox, which coupling devices furthermore be provided by way of a simple and efficient production process when the cover is formed out of a sheet metal blank.

In such an embodiment the resilient side panels function as click fingers, which can be used for securely coupling the cover with the firebox in both the portable configuration and the barbecue configuration.

For example when the resilient side panels are used in combination with coupling devices embodied as tab slot connections, the side panels can be used to bias the taps into the corresponding slots to secure the connection and prevent substantial movement of the firebox relative to the cover in a direction perpendicular to the top of the cover and/or to prevent a premature uncoupling of said coupling devices.

In an embodiment of a barbecue according to the invention, when in the portable configuration, the firebox and the cover engage each other such that they form a box, of which the cover provides the top panel, the left side panel and the right side panel, and the firebox provides the bottom panel, the front panel and the rear panel. Such an embodiment provides a compact and firm configuration, in particular when the side panels of the cover tightly fit between the front and rear panel of the firebox. With such an embodiment, the barbecue, in particular the firebox, can be used to store and transport for example barbecue equipment and/or the grate and/or coals, etc.

In a preferred embodiment, the cover and the firebox are configured such that, in the portable configuration, they form a closed box, i.e. both components fit into each other such that no gaps are formed between them. Thus, even small components can be securely held inside the firebox when in the portable configuration.

In an embodiment of a barbecue according to the invention, slots or apertures for receiving corresponding tabs or protrusions provided at the free ends of one of the side panels of the cover are provided in a sections of the bottom panel of the firebox that respectively extend beyond the left side panel and the right side panel of the firebox. Thus, the firebox comprises a compartment for holding embers, delimited by the front panel, rear panel, side panels and bottom panel of the firebox, which compartment has no opening in the bottom thereof.

In an alternative embodiment, the firebox can be provided with a double bottom, the slot or apertures being provided in the outside bottom panel of the firebox.

In a further embodiment of a barbecue according to the invention, the bottom panel, the front panel and the rear panel of the firebox extend beyond the left side panel and the right side panel of the firebox, such that the firebox has substantially U-shaped side sections for receiving the left side panel and the right side panel when the cover is combined with the firebox in the portable configuration.

In a further preferred embodiment of a barbecue according to the invention, when in the portable configuration, the side panels of the cover tightly fit between the front, rear and bottom panels of the firebox, such that the firebox and the cover form a box, preferably a closed box, of which the cover provides the top panel, the left side panel and the right side panel, and the firebox provides the bottom panel, the front panel and the side panel.

With such an embodiment, the barbecue, in particular the firebox, can be used to store and transport for example barbecue equipment and/or the grate and/or coals, etc.

In a further preferred embodiment of a barbecue according to the invention, the slots for receiving the tabs of the cover are provided in the bottom panel within the substantially U-shaped side sections. This embodiment provides the firebox, in particular the bottom panel of the firebox, with sections for providing coupling devices in the form of slots of apertures, outside a compartment for holding embers.

In a further embodiment of a barbecue according to the invention, the front panel and the rear panel of the firebox extend above the left side panel and the right side panel of the firebox, such that, in the portable configuration, the cover is received between the front panel and the rear panel of the firebox. In a further preferred embodiment, the firebox and the cover are configured for holding the grate between them when in the portable configuration. In such an embodiment the grate can be located on the open top of the firebox, between the firebox and the cover when combined in the portable configuration.

In a further preferred embodiment, the front panel and the rear panel of the firebox extend at an angle relative to each other, i.e. diverge in a direction away from the bottom panel of the firebox, such that they are farther apart at the top end of the fire box and closer together near the bottom panel of the fire box, to guide the side panels of the cover into the U-shaped sections, i.e. between the front panel and the rear panel of the firebox, when the cover is being mounted onto the firebox.

In a further embodiment of a barbecue according to the invention, the free end of each side panel of the cover is provided with a support surface and at least one tab, which at least one tab extends at an angle to the side panel of the cover and, when in the cover is coupled with the firebox, extends substantially parallel to a bottom surface of the bottom panel of the firebox, and which support surface is spaced from the tab at a distance substantially similar to the thickness of the bottom panel of the firebox, such that, when in the cover is coupled with the firebox, the bottom panel is locked between the support surface and the tab, and movement of the firebox relative to the cover in a direction parallel to the side panels of the cover is prevented. Such an embodiment of the fastening devices provides a secure connection between the cover and the firebox, in particular when combined with flexible side panels that bias, i.e. resiliently force, the fastening devices into engagement.

In an embodiment of a barbecue according to the invention, the cover is folded from a single blank of sheet metal, which provides a simple a quick production process.

In an embodiment of a barbecue according to the invention, the front panel the bottom panel and the rear panel of the firebox are folded from a single blank of sheet metal, which provides a simple a quick production process. In a further embodiment, the side panels of the firebox are welded in the thus formed folded part of the firebox. In an alternative embodiment, the side panels are part of the same blank as the front, bottom and rear panels, and the firebox is folded from that single blank after which the panels are for example fixed to each other by welding.

In a preferred embodiment, the barbecue according to the invention has an elongate shape, its longitudinal axis extending perpendicular to the side panels of the firebox. In an embodiment, the barbecue is substantially symmetric relative to a plane of symmetry, which plane of symmetry extends perpendicular to the side panels of the firebox. In a further preferred embodiment, the barbecue is provided with a grip at a short end of the barbecue, such that, when it is carried in the portable configuration its longitudinal axis extends in the vertical direction. In such an embodiment, the relatively high grip in combination with a relatively low center of gravity, keeps the barbecue extra stable while being carried.

In an embodiment, the firebox is provided with a spacer bottom, i.e. the compartment defined by the firebox for holding the embers is provided with a double bottom that provides a space between the spacer bottom, which effectively forms the bottom of the compartment and the bottom panel of the firebox. Thus a barrier is provided in the form of an additional space that prevents the bottom panel of the firebox, i.e. the outside panel, from direct contact with the embers. It is submitted that the spacer bottom itself in addition functions as a heat shield as well. Thus, the outside of the firebox is not warmed up that much during use of the barbecue.

In an embodiment, the barbecue comprises an ember retainer, which is preferably provided in the form of a basket, preferably folded from a blank of sheet metal, which is mounted, i.e. hung, in the firebox. The ember retainer provides some distance between the burning embers and the panels that form the firebox, and thus, the outside of the firebox is not warmed up that much during use of the barbecue.

In an embodiment of a barbecue according to the invention, the firebox is provided with a grip, preferably in the form of a flexible strip mounted with opposite ends to the front panel and the rear panel of the firebox. The strip is preferably made of a heat insulating material and/or is provided sections of heat insulating material, for example a silicone material or leather, to prevent heat of the firebox to be transferred to the grip.

In an alternative embodiment, the grip is for example provided in the form of an aperture, fit for engagement by hand, which aperture is provided in one of the panels of the cover or firebox, for example in a section of the bottom panel of the firebox extending beyond the side panels of the firebox.

In a preferred embodiment, the grate is made out of a blank of sheet metal, which blank is cut and subsequently folded.

In an embodiment of a barbecue according to the invention, the grate is configured to rest on the left side panel and the right side panel of the firebox. In a preferred embodiment, the grate is provided with spacer walls extending substantially perpendicular to the food support surface, which spacer walls are provided with slots, or are spaced relative to each other, such that the spacer walls enable the grate to be mounted onto the firebox in a raised position, in which the spacer walls rest upon the side panels and/or front panel and rear panel of the firebox, and in a lowered position, in which the side panels and/or front panel and rear panel of the firebox are received in slots and/or spaces respectively provided in or between the spacer walls.

In an embodiment, the spacer side walls are provided at opposite ends of the grate, which spacer side walls are provided with a flange that extends parallel to the food support surface, and which flanges are provided with positioning slots for receiving positioning tabs of the firebox. In addition to these flanged spacer side walls, spacer walls are provided along the front and rear edge of the grate, such that in the lowered position the side panels of the firebox are each received between the front and rear spacer walls on one side and the flanged spacer wall on the other side, and in the raised position, the grate rests with one of the flanges on one side panel and with a front spacer wall and a rear spacer wall on the other side panel.

Thus, the spacer walls enable the grate to be mounted in a lowered and in a raised position on the side panels of the firebox. In the raised position the grate rests with the spacer walls on the side panels of the firebox. In the lowered position the spacer walls of the grate can be positioned along the side panels and/or front and rear panels of the firebox. Preferably, the lowered position also allows for the cover to be mounted in the portable configuration over the grate.

In a preferred embodiment, some or all of the spacer walls are embodied as skewer wall as well, i.e. are provided with slots for receiving skewers and supporting those skewers at a distance from the grill, i.e. the food support surface of the grate.

In an embodiment of a barbecue according to the invention, the grate is provided with preferably parallel skewer side walls on opposites sides of the grate, which skewer side walls extend substantially perpendicular to the food support surface, and which skewer side walls are provided with skewer slots for receiving a skewer, such that the skewer side walls can support that skewer at a distance above the food support surface of the grate. The skewer slots are configured to provide sufficient distance between skewer and the grill forming the food support surface to enable the skewers to support food products and preferably to allow those skewers to be rotated. In an embodiment the skewers are supported at a distance of at least 1 cm of the food support surface, preferably at least 1.5 cm, for example 2 cm above the food support surface.

In an embodiment, the skewer slots are V-shaped to facilitate positioning a skewer in the slots.

According to a second aspect, the invention furthermore provides a skewer grate, which skewer grate can be used with a barbecue according to the first aspect of the invention, which skewer grate can be used in a first position, in which its food support surface faces upwards, for supporting food products to be barbecued above the firebox, and a second position, in which the its food support surfaces faces downwards, for supporting skewers above the firebox. Such a skewer grate allows for a flexible use of the barbecue.

In an embodiment, the panels of the firebox are provided with skewer slots for supporting skewers.

In an embodiment of a barbecue according to the invention, the front panel and the rear panel of the firebox extend above the left side panel and the right side panel of the firebox, such that the cover, more in particular the top panel of the cover, when in the portable configuration, is received between the front panel and the rear panel of the firebox. Thus enclosing the top panel between the front panel and the rear panel of the firebox provides a firm configuration, i.e. a configuration that can withstand impact during transport.

In an embodiment, the portable barbeque comprises a firebox for holding embers, a grate for supporting food products to be barbecued above the embers, and a cover for said firebox, wherein the cover is received between the front panel and the rear panel of the firebox, when the barbeque is on the portable configuration.

In an embodiment, the firebox has a bottom panel, a front panel, a rear panel, a left side panel and a right side panel, which panels together form the firebox, the firebox having an open top. The front panel and the rear panel of the firebox have a similar height and length, and the left side panel and the right side panel of the firebox have a similar height and length.

Furthermore, the height of the left side panel and the right side panel of the firebox are smaller than the height of the front panel and the rear panel of the firebox. Thus, the front panel and the rear panel of the firebox extend above the left side panel and the right side panel of the firebox.

Furthermore, the front panel and the rear panel of the firebox extend beyond the left side panel and the right side panel of the firebox, such that the length of the front panel and the rear panel of the firebox is larger than the length of the compartment, i.e. the space defined by the front panel, the rear panel the left side panel and the right side panel of the firebox, for holding the embers.

Furthermore, the length and preferably the height of the left side panel and the right side panel of the firebox are similar to the length and preferably the height of the left side panel and the right side panel of the cover, such that the cover, or at least the side panels of the cover, can be received between the front panel and the rear panel of the firebox.

Preferably, in the portable configuration, the cover is received between the front panel and the rear panel of the firebox, and the front panel and the rear panel of the firebox extend above the top panel of the cover, preferably to such an extent that they extend up to or beyond any feet provided on the top panel of the cover. In such an embodiment, the firebox and the cover form a closed box, of which the cover provides the top panel, the left side panel and the right side panel, and the firebox provides the bottom panel, the front panel and the rear panel. Thus, the barbecue, in particular the firebox, can be used to store and transport for example barbecue equipment and/or the grate and/or coals, etc.

In an embodiment, the grate has a food product support surface, which support surface is provided with a pattern of apertures, and which grate is configured to be mounted onto the firebox, preferably on the left side panel and the right side panel of the firebox, such that it covers the open top of the firebox, In the portable configuration the cover is mounted onto the firebox such that the top panel of the cover covers the open top of the firebox, and the left side panel and the right side panel of the cover extend along the left panel and the right panel of the firebox.

In a barbeque configuration, the firebox is mounted onto the cover with the open end of the firebox facing up, such that the cover forms a stand for the firebox, and the left side panel and the right side panel of the cover vertically space the firebox at a distance from a support surface. Furthermore, in the barbeque configuration, the grate can be mounted onto the firebox such that it covers the open top of the firebox and extends over embers held in the firebox.

The invention furthermore provides a method for installing a barbeque, said method comprising the steps:
carrying a barbecue according to one the invention in the portable configuration to a barbecue location;
removing the cover form the firebox of the barbecue and placing the cover onto a support surface, e.g. a table top; and
mounting the firebox on the cover, such that the cover forms a stand for the firebox, and the left side panel and the right side panel of the cover vertically space the firebox at a distance from a support surface.

Advantageous embodiments of the barbecue according to the invention and the method according to the invention are disclosed in the subclaims and in the description, in which the invention is further illustrated and elucidated on the basis of a number of exemplary embodiments, of which some are shown in the schematic drawing.

Figure 2:
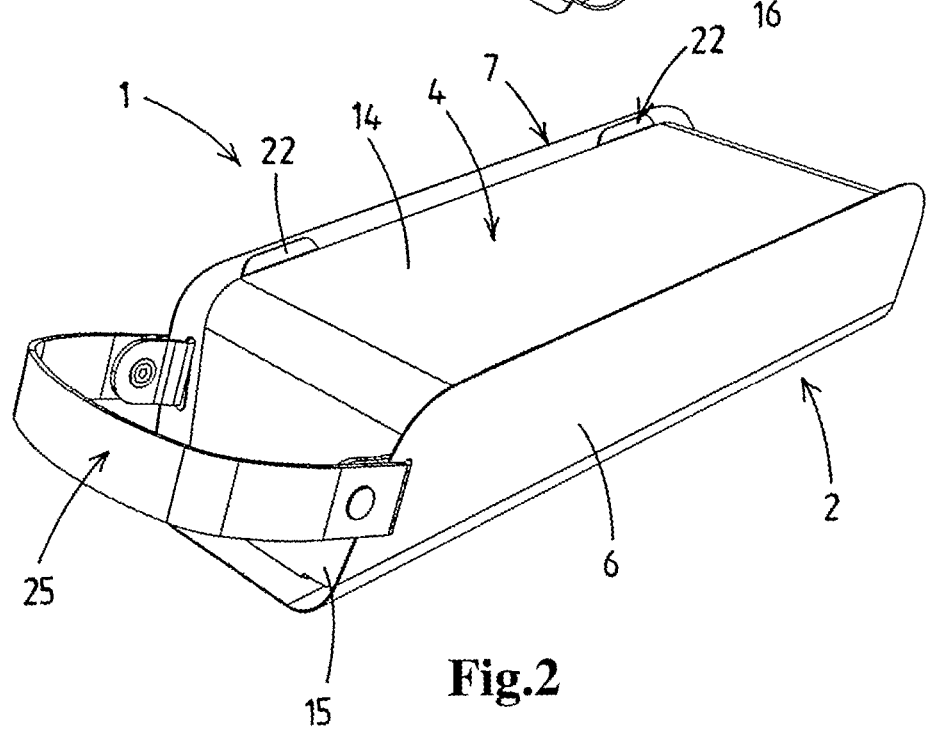
Figure 3:
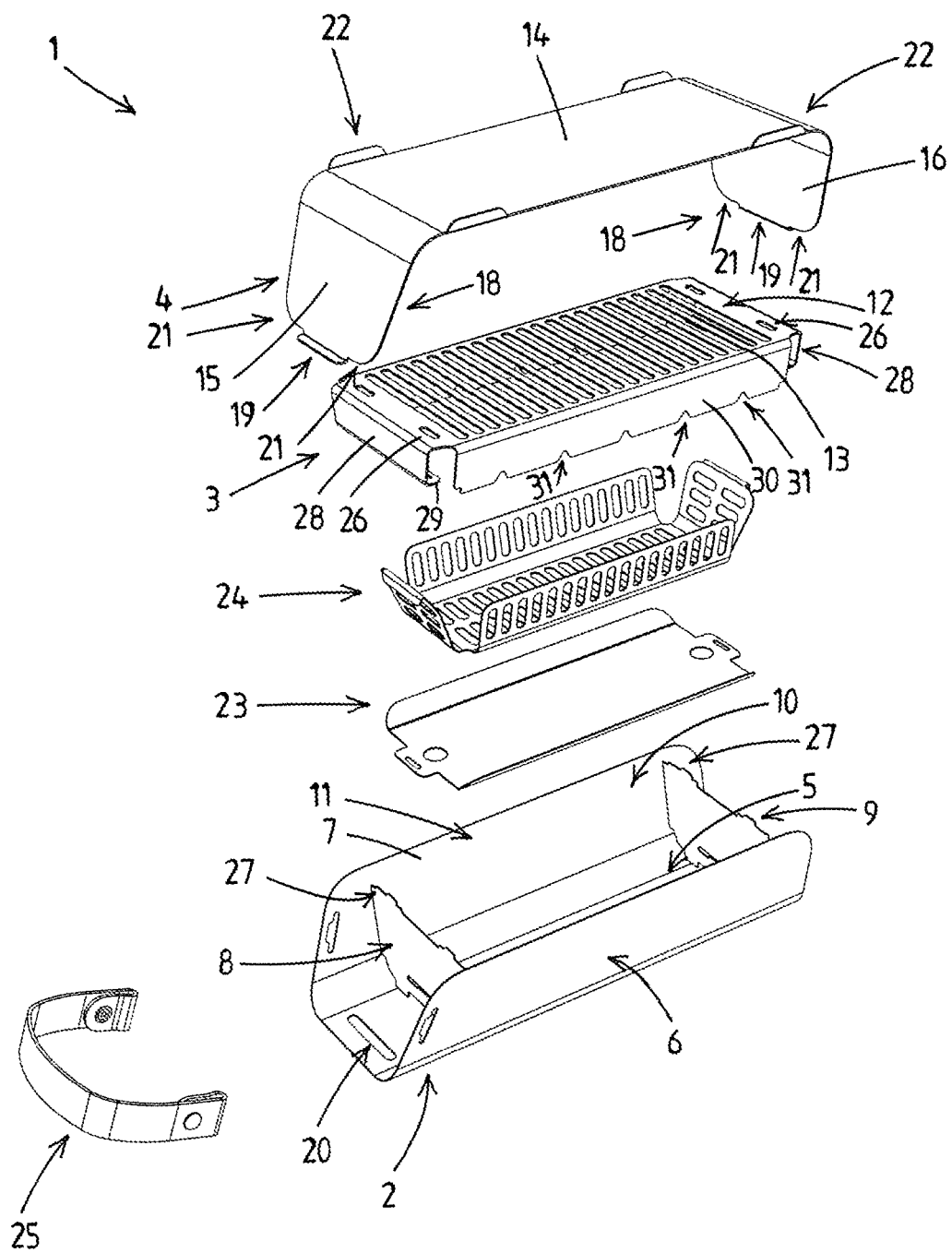
Figure 4:
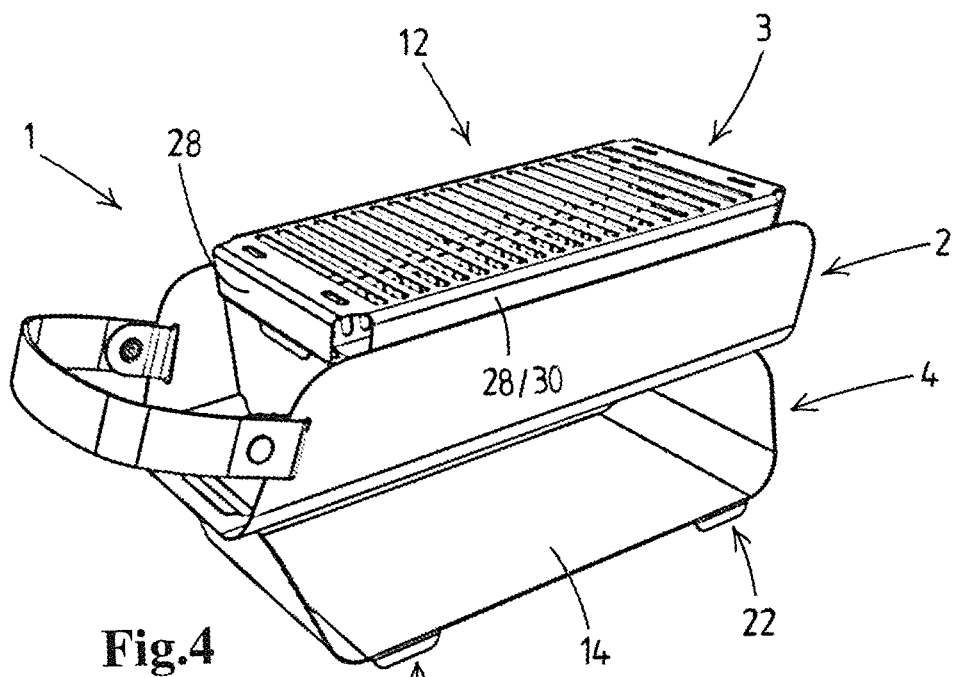
Figure 5:
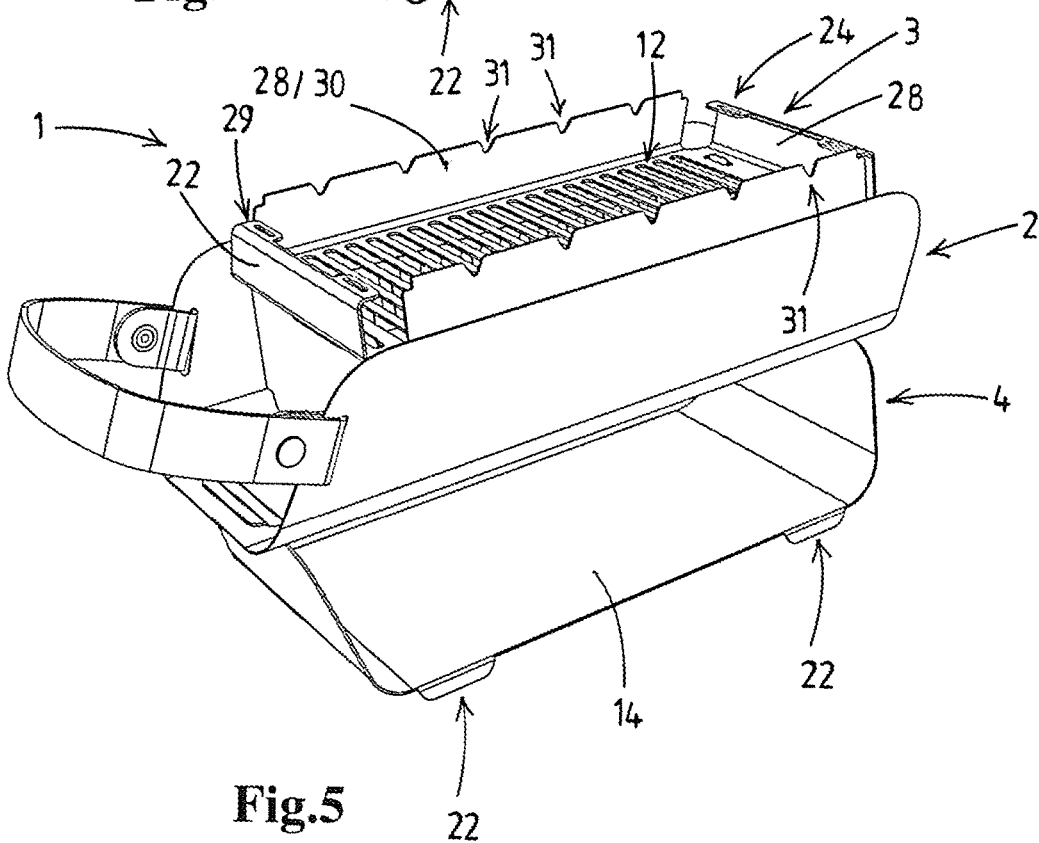

In the drawings
FIG. 1 shows a perspective view of a portable barbecue according to the invention in a barbecue configuration;
FIG. 2 shows a perspective view of the barbecue of FIG. 1 in a portable configuration;
FIG. 3 shows an exploded view of the barbecue of FIG. 1;
FIG. 4 shows a perspective view of the barbecue of FIG. 1 with a grate in a raised position; and
FIG. 5 shows a perspective view of the barbecue of FIG. 1 with a grate in a skewer position.

FIG. 1 shows a perspective view of a portable barbecue 1 according to the invention in a barbecue configuration. FIG. 2 shows a perspective view of the barbecue 1 in a portable configuration.

The portable barbecue 1 comprises a firebox 2 for holding embers, a grate 3 for supporting food products to be barbecued above the embers, and a cover 4 for the firebox 2.

The firebox 2 has a bottom panel 5, a front panel 6, a rear panel 7, a left side panel 8 and a right side panel 9, which panels together form the firebox, i.e. the define a compartment 10 for holding embers. The firebox 2 has an open top 11.

The grate 3 has a food product support surface 12, which support surface is provided with a pattern of apertures 13. The grate 3 is configured to be mounted over the open top 11 of the firebox 2.

The cover 4 has a top panel 14, a left side panel 15 and a right side panel 16, which side panels are provided at opposite ends of the top panel, such that the cover 4 is substantially U-shaped in a frontal view. The left side panel 15 and right side panel 16 are spaced for receiving the firebox 2 between them.

According to the invention, the firebox 2 and the cover 4 are adapted to be coupled in a barbecue configuration in which the cover functions as a cover of the firebox, shown in FIG. 1, and in a portable configuration in which the cover functions as a stand of the firebox that vertically spaces the firebox at a distance from a support surface, shown in FIG. 2.

In the portable configuration, the cover 4 is mounted onto the firebox 2 such that the top panel 14 of the cover 4 covers the open top 11 of the firebox, and thus the compartment for holding the embers. In the portable configuration, the left side panel 15 and the right side panel 16 of the cover extend along the left side panel 8 and the right side panel 9 of the firebox 2. In the particular embodiment shown, the side panels of the cover 4 and firebox 2 overlap when the barbecue, in its portable configuration, is seen in side view. It is noted that the cover and the firebox are dimensioned such that the side panels of the cover are spaced from the side panels of the firebox when the cover is mounted on the firebox.

In the preferred embodiment shown, the firebox 2 and the cover 4, when in the portable configuration, engage each other such that they form a closed box, of which the cover provides the top panel, the left side panel and the right side panel, and the firebox provides the bottom panel, the front panel and the side panel. Such an embodiment provides a compact and firm configuration, in particular when the side panels of the cover tightly fit between the front and rear panel of the firebox. With such an embodiment, the barbecue, in particular the firebox, can be used to store and transport for example barbecue equipment and/or the grate and/or coals, etc.

In the barbecue configuration, the firebox 2 is mounted onto the cover 4, such that the cover forms a stand for the firebox. In this configuration, the left side panel 15 and the right side panel 16 of the cover 4 vertically space the firebox 2 at a distance from a support surface 17 that supports the cover. When the cover 4 functions as a stand, it positions the fire box 4 at a distance from the support surface 17, which distance allows for air to freely circulate below the firebox and which distance prevents the heat radiation of the firebox to burn the support surface. This is in particular beneficial when the barbecue is set up on a table top.

In an embodiment the side panels 15, 16 of the cover 4 are dimensioned such that the cover functions as a stand positions the firebox at a distance from the supporting surface of at least 3 cm, preferably at least 4 cm, for example 5 cm. In the preferred embodiment shown, the side panels of the cover have a height similar, but not identical, to the height of the front panel and rear panel of the firebox. They space the firebox at a distance of about 8 cm from the top panel of the cover and about 9 cm form the support surface onto which the barbecue has been set up.

In the preferred embodiment shown the cover 4 is provided with two side panels 15, 16, which side panels are provided on opposite sides of the top panel 14 of the cover. The cover is open at the front and the rear, i.e. no front and rear panel are provided. In the embodiment shown, the cover thus has a U-shaped profile when seen in frontal view. The open front and back of the cover allow for air to freely pass below the firebox, and thus allow for venting the support surface as the well as the firebox, and thus furthermore reduce the chance of the support surface getting burned.

The side panels of the embodiment shown are simple rectangular panels. However, the side panels can have other shapes, for example may be comprise multiple apertures, cut outs, etc., as long as they are able to function as feet for spacing the firebox relative to the support surface.

Also, in an alternative embodiment, additional supports may be provided along the front side and back side of the cover, for example in the form of partial front and rear panels. These partial panels extend only along sections of the front and rear to enable proper ventilation below the firebox and/or along the support surface during use of the barbecue.

Also, in an alternative embodiment, the cover may be provided with apertures, for example a grid of openings may be provided in the top panel of the cover. Such openings may further enhance ventilation of the firebox and of the support surface during use of the barbecue.

It is noted that in addition to the spacing provided by the cover, the top panel of the cover provides an additional protection against heat radiating from the firebox and that deflects it away from the support surface.

In the embodiment shown, the cover 4, when in the barbecue configuration, is positioned with its top panel 14 facing down, i.e. towards a support surface, and its side panels 15, 16 extending upwards. Thus, the top panel of the cover forms a base of the stand that is created by the cover.

In an alternative embodiment the cover is configured for supporting the firebox on top of its top panel, the side panels having free ends configured as feet that support the cover, and thus the firebox mounted on top of that cover, or a support surface.

In the preferred embodiment shown, the left side panel 15 and right side panel 16 of the cover 4 are provided with free ends 18 that are configured to, in the barbeque configuration, be coupled with the firebox 2. Thus, the side panels of the cover 4 not only space the fire box away from the support surface, but also away from the top panel of the cover.

The space thus created between the bottom panel of the firebox and the top panel of the cover allows for air to flow directly along the bottom side of the firebox, and thus optimally cool said bottom surface, and in turn prevent the support surface and/or the top panel of the cover to get burned by heat radiated form the firebox during use.

In the preferred embodiment shown, the firebox and the cover are configured such that the free ends of the side panels are coupled with the bottom panel of the firebox, to provide a maximum spacing between the bottom panel of the firebox and the top panel of the cover, when in the barbecue configuration.

In an alternative embodiment, the firebox and the cover are configured such that the free ends of the side panels are coupled with the side panels of the firebox, for example are provided with tabs that are to be inserted into slots provided in the side panels of the firebox.

In the preferred embodiment of a barbecue according to the invention shown, the firebox 2 and the cover 4 are provided with coupling devices in the form of a tab in slot connection. The free ends 18 of the left side panel 15 and the right side panel 16 of the cover 4 are provided with a tap 19, and the firebox 2 is provided with slots 20 in its bottom panel 5 for receiving those tabs 19.

By providing a tab slot connection, or similar coupling devices, the barbecue can be assembled and disassembled without the need of tools, and is thus easy to use. The invention thus furthermore provides a portable barbecue which can be quickly and easily disassembled into a compact unit for carrying and storing and can be as quickly and easily set up for use.

Furthermore, in the preferred embodiment shown, the left side panel 15 and the right side panel 16 are embodied as resilient side panels, which resilient side panels need to be pushed towards each other to position the taps into the slots and thus couple the cover with the firebox. Once the tabs are inserted in the slots, the side panels resiliently bias the tabs into engagement with the slots, and thus secure the connection, i.e. maintain the coupling, between the cover and the firebox.

By thus providing the cover with flexible side panels, the barbecue is provided with simple and reliable coupling devices for coupling the cover with the firebox, which coupling devices furthermore be provided by way of a simple and efficient production process when the cover is formed out of a sheet metal blank.

In the preferred embodiment of a barbecue 1 according to the invention shown, the coupling devices provided at the free ends 18 of the side panels 15, 16 of the cover 4, which are used to couple the cover 4 with the firebox 2 when in the barbecue configuration, are also used for coupling the cover with the firebox when in the portable configuration. More in particular, in the preferred embodiment shown, the cover 4 and the firebox 2 are configured such that the tab slot connection that is used to connect the cover with the firebox in the barbecue configuration is also used to connect the cover with the firebox in the portable configuration. Thus, the design of the cover can be kept simple.

In the preferred embodiment of a barbecue according to the invention shown, the bottom panel 5, the front panel 6 and the rear panel 7 of the firebox 2 extend beyond the left side panel 8 and the right side panel 9 of the firebox 2, such that the firebox has substantially U-shaped side sections for receiving the left side panel 15 and the right side panel 16 of the cover 4, when the cover is combined with the firebox to achieve the portable configuration.

The slots 20 for receiving the tabs 19 provided at the free ends 18 of the side panels 15, 16 of the cover 4 are provided in sections of the bottom panel 5 of the firebox 2 that extend beyond the left side panel 8 and the right side panel 9 of the firebox 2. Thus, the firebox can be provided with slots of a slot tab connection for coupling with the cover outside the compartment 11 for holding embers. Thus, the compartment 10 for holding embers, which compartment is delimited by the front panel 6, rear panel 7, side panels 8, 9 and bottom panel 5 of the firebox, has no openings in its bottom.

In the preferred embodiment of a barbecue according to the invention shown, when in the portable configuration, the side panels 15, 16 of the cover 4 tightly fit between the front panel 6, rear panel 7 and bottom panel 5 of the firebox 2. Thus, the firebox 2 and the cover 4 form a closed box, shown in FIG. 2, of which box the cover 4 provides the top panel, the left side panel and the right side panel, and the firebox 2 provides the bottom panel, the front panel and the side panel. With such an embodiment, the barbecue, in particular the firebox, can be used to store and transport for example barbecue equipment and/or the grate and/or coals, etc.

It is noted that in the preferred embodiment shown, the front panel 6 and the rear panel 7 of the firebox 2 extend at an angle relative to each other, such that they are farther apart at the top end of the fire box and closer together near the bottom panel of the fire box, to guide the side panels 15, 16 of the cover 4 into the U-shaped sections at opposite ends of the firebox when the cover is being mounted onto the firebox.

Furthermore, in the particular embodiment shown, the front panel 6 and the rear panel 7 of the firebox 2 extend above the left side panel 8 and the right side panel 9 of the firebox 2, such that, in the portable configuration, see FIG. 2, the cover 4 is received between the front panel 6 and the rear panel 7 of the firebox 2. Thus enclosing the top panel between the front panel and the rear panel of the firebox provides a firm configuration, i.e. a configuration that can withstand impact during transport.

In the embodiment of a barbecue according to the invention shown, the free end 18 of each side panel 15, 16 of the cover 4 is provided with a central tab, and a support surface 21 at each side of said tab. In the embodiment shown, the support surfaces 21 are provided in the form of an edge of the side panel. In an alternative embodiment, the supports surface can for example also be embodied in the form of a tab.

At each free end 18 of the side panels 15, 16 of the cover 4, the tab 19 extends at such an angle to the side panel, that, when the cover is coupled with the firebox, the tabs extends substantially parallel to the bottom surface of the bottom panel of the firebox.

At the same time, the support surface 21 is spaced from the tabs 19 at a distance substantially similar to the thickness of the bottom panel 5 of the firebox 2, such that, when the cover is coupled with the firebox, the bottom panel 5 is locked between the support surface 21 and the tab 19, such that movement of the firebox relative to the cover in a direction parallel to the side panels of the cover is prevented.

In a further embodiment, the tabs are inclined relative to a direction at which the free end of the side panel is inserted into the slot, to provide the side panels with a click finger like function, to facilitate coupling the cover with the firebox.

In the preferred embodiment of a barbecue according to the invention shown, the cover 4 is provided with feet 22. In the preferred embodiment shown the feet 22 are provided in the form of tabs extending along the front and rear of top panel 14. The tabs 22 are folded at an angle relative to the top panel 14, for spacing the top panel from the support surface 17. The feet provide the top cover with stability on an irregular support platform.

The front panel 6 and the rear panel 7 of the firebox 2 are dimensioned such that, in the portable configuration, they extend above the top panel 14 of the cover 4, in the preferred embodiment shown in FIG. 2 to such an extent that they extend beyond the feet provided on the top cover. Thus, they prevent the feet from forming protrusions that extend beyond the contour of the barbecue, which protrusions may hook into foreign bodies or scratch surfaces during transport of the barbecue or when the barbecue is being stored.

FIG. 3 shows an exploded view of the barbecue of FIG. 1, in which the fire box 2, the cover 4 and the grate 3 are shown in isolation. The barbecue shown furthermore comprises a spacer bottom 23 and an ember retainer 24.

The spacer bottom 23 is provided in the firebox 2. The spacer bottom 23 effectively forms the bottom of the compartment 10 for holding the embers, and thus creates a space between the compartment 10 and the bottom panel 5 of the firebox 2. Thus a barrier is provided in the form of an additional space that prevents the bottom panel of the firebox, i.e. the outside panel, from direct contact with the embers. Thus, the outside of the firebox is not warmed up that much during use of the barbecue.

The barbecue 2 is furthermore provided with the ember retainer 24, which is provided in the form of a basket, folded from a blank of sheet metal, which is mounted, i.e. hung, in the firebox. When the barbecue is sued for barbecuing food products, the ember retainer 24 provides some distance between the burning embers and the panels that form the firebox, and thus, the outside of the firebox is not warmed up that much during use of the barbecue.

In the particular embodiment shown, the barbecue is according to the invention, more in particular the firebox 2 is provided with a grip 25 in the form of a flexible strip mounted with opposite ends to the front panel 6 and the rear panel 7 of the firebox 2.

In an alternative embodiment, the grip is for example provided in the form of an aperture, fit for engagement by hand, which aperture is provided in one of the panels of the cover or firebox, for example in a section of the bottom panel of the firebox extending beyond the side panels of the firebox.

In the preferred embodiment shown, the barbecue according to the invention has an elongate shape, its longitudinal axis extending perpendicular to the side panels 8, 9 of the firebox 2. It is submitted that in use, a user will typically sit along a long side of the barbecue, such that he/she faces the front or rear panel of the firebox of the barbecue.

Furthermore, in the exemplary embodiment shown, the barbecue 1 is substantially symmetric relative to a plane of symmetry, which plane of symmetry extends perpendicular to the side panels of the firebox.

In the preferred embodiment shown, the grip 25 is provided at a short end of the barbecue 1, such that, when it is carried in the portable configuration, its longitudinal axis extends in the vertical direction. In such an embodiment, the relatively high grip in combination with a relatively low center of gravity, keeps the barbecue extra stable while being carried.

In the preferred embodiment shown, the cover 4 of the barbecue 1 is folded from a single blank of sheet metal, which provides a simple and quick production process. From the exploded view shown in FIG. 3, it is clear that the entire cover can be bent form a single blank.

Furthermore, the front panel 6, the bottom panel, 5 and the rear panel, 7 of the firebox 2 are folded from a single blank of sheet metal as well. In the embodiment shown, the side panels 8, 9 of the firebox 2 are welded in the thus formed folded part of the firebox. In an alternative embodiment, the side panels are part of the same blank as the front, bottom and rear panels, and the firebox is folded from that single blank after which the panels are for example fixed to each other by welding.

In the embodiment shown, the grate 3 is made out of a blank of sheet metal. The grate 3 is configured to rest on the left side panel 8 and the right side panel 9 of the firebox 2. To keep the grate 3 in position the grate is provided with slots, which positioning slots 26 match with corresponding positioning tabs 27 provided on top edges of the side panels 8, 9 of the firebox 2.

In the preferred embodiment shown, the grate 3 is furthermore provided with spacer walls 28 that extend substantially perpendicular to the food support surface 12. In the embodiment shown, the grate is provided with spacer side walls that are provided with a flange 30 that extends parallel to the food support surface 12, and which flanges are provided with additional positioning slots 26 for receiving the positioning tabs 27 of the firebox 2. Furthermore, the grate is provided with walls along the front and rear, which walls function as spacer walls as well. In addition, these front and rear spacer walls also function as skewer walls.

The spacer walls 28 enable the grate 3 to be mounted in a lowered position, shown in FIG. 1, and in a raised position, shown in FIG. 4, on the side panels of the firebox. In the raised position the grate 3 at one end rests with the flange 29 of one of the spacer side walls 28 on one of the side panels 8, 9 of the firebox 2 and with the front and rear spacer wall on the other side wall of the firebox at the opposite end of the grate. The spacer side walls thus function as spacers. In the lowered position the side panels of the firebox are received between a spacer side wall located on one side of the respective side panel, and the front and rear spacer walls, located on an opposite side of the respective side panel. The spacer walls 28 of the grate 3 are positioned alongside the side panels 8, 9 of the firebox 2, as shown in FIG. 1.

The lowered position also allows for the cover 4 to be mounted in the portable configuration over the grate 3. In the preferred embodiment shown, the firebox 2 and the cover 4 are configured for holding the grate 3 between them when in the portable configuration. In such an embodiment the grate can be located on the open top of the firebox, between the firebox and the cover when combined in the portable configuration.

Furthermore, in the embodiment of a barbecue according to the invention shown, the grate 3 is provided with preferably parallel skewer side walls 30 on opposite sides of the grate. The skewer side walls 30 extend substantially perpendicular to the food support surface 12 of the grate, and are provided with skewer slots 31 for receiving a skewer. Thus, the grate 3 can be used in a barbecue position, as shown in FIG. 1 and FIG. 4, in which the food support surface 12 is turned upwards, and in a skewer position, as shown in FIG. 5, in which the food support surface 12 is turned downward, facing the firebox 2, for supporting skewers above the open top 11 of the firebox 2.

Thus, when the grate 3 is in the skewer position the skewer side walls 30 can support skewers at a distance above the food support surface 12 of the grate. The skewer slots 31 are configured to provide sufficient distance between supported skewer and the part of the grate forming the food support surface to enable the skewers to support food products and preferably to allow those skewers to be rotated. In an embodiment the skewers are supported at a distance of at least 1 cm of the food support surface, preferably at least 1.5 cm, for example 2 cm above the food support surface.

In an embodiment, the skewer slots are V-shaped to facilitate positioning a skewer in the slots.

According to a second aspect, the invention furthermore provides a skewer grate, which can be used with a barbecue according to the first aspect of the invention, which skewer grate can be used in a first position, in which its food support surface faces upwards, for supporting food products to be barbecued above the firebox, and a second position in which the its food support surfaces faces downwards, for supporting skewers above the firebox. Such a skewer grate is shown in FIGS. 1 and 3.

REF SIGNS 01 barbecue
02 firebox
03 grate
04 cover
05 bottom panel fire box
06 front panel fire box
07 rear panel fire box
08 left side panel fire box
09 right side panel fire box
10 compartment for holding embers.
11 open top fire box
12 support surface grate
13 apertures grate
14 top panel of the cover
15 left side panel of the cover
16 right side panel of the cover
17 support surface
18 free ends side panels cover
19 tabs cover
20 slots firebox
21 support surface free end side panel
22 feet
23 spacer bottom 24 ember retainer
25 grip
26 positioning slots grate
27 positioning tabs side tabs firebox.
28 spacer side walls grate
29 flange spacer walls grate
30 skewer side walls grate
31 skewer slot

The invention claimed is:

1. Portable barbecue, the portable barbeque comprising:
a firebox for holding embers, a grate for supporting food products to be barbecued above the embers, and a cover for said firebox,
wherein the firebox has a bottom panel, a front panel, a rear panel, a left side panel and a right side panel, which panels together form the firebox, the firebox having an open top,
wherein the grate has a food product support surface, which support surface is provided with a pattern of apertures, and which grate is configured to be mounted over the open top of the firebox,
wherein the cover has a top panel, a left side panel and a right side panel, which side panels are provided at opposite ends of the top panel, such that the cover is substantially U-shaped in a frontal view, and which left side panel and right side panel are spaced for receiving the firebox between them,
wherein the firebox and the cover are adapted to be coupled in a portable configuration, in which the cover functions as a cover of the firebox, and in a barbecue configuration, in which the cover functions as a stand of the firebox,
in which portable configuration the cover is mounted onto the firebox such that the top panel of the cover covers the open top of the firebox, and the left side panel and the right side panel of the cover extend along the left panel and the right panel of the firebox, and
in which barbeque configuration, the firebox is mounted onto the cover, such that the cover forms a stand for the firebox, and the left side panel and the right side panel of the cover vertically space the firebox at a distance from a support surface,
wherein the left side panel and right side panel of the cover are provided with a coupling device at a free end of the respective side panel, which coupling devices are configured to, in the barbeque configuration, be coupled with coupling devices provided on the firebox, such that in the barbecue configuration the side panels of the cover space the bottom panel of the firebox at a distance from the top panel of the cover.

2. Barbecue according to claim 1, wherein the cover is provided with feet, preferably in the form of tabs extending along the front and rear of top panel which tabs are folded at an angle relative to the top panel, for spacing the top panel of the cover relative to the support surface when the cover supports the firebox in the barbecue configuration.

3. Barbecue according to claim 1, wherein the cover is configured to, in the portable configuration, be coupled with the firebox at the free ends of its left side panel and right side panel.

4. Barbecue according to claim 1, wherein the firebox and the left side panel and the right side panel of the cover are provided with a tab in slot connection which, in the barbeque configuration, couples the cover with the firebox.

5. Barbecue according to claim 3, wherein the firebox and the left side panel and the right side panel of the cover are provided with a tab in slot connection which, in the barbeque configuration and also in the portable configuration couples the cover with the firebox.

6. Barbecue according to claim 4, wherein the left side panel and the right side panel are embodied as resilient side panels, which resilient side panels need to be pushed away from each other or need to be pushed towards each other to position the taps into the slots and thus couple the cover with the firebox, and which resiliently bias the tab in the slot once the cover is coupled with the firebox.

7. Barbecue according to claim 1, wherein, when in the portable configuration, the firebox and the cover engage each other such that they form a box, of which the cover provides the top panel, the left side panel and the right side panel, and the firebox provides the bottom panel, the front panel and the side panel.

8. Barbecue according to claim 1, wherein the bottom panel, the front panel and the rear panel of the firebox extend beyond the left side panel and the right side panel of the firebox, such that the firebox has substantially U-shaped side sections for receiving the left side panel and the right side panel when the cover is combined with the firebox in the portable configuration.

9. Barbecue according to claim 8, wherein the front panel and the rear panel of the firebox extend above the left side panel and the right side panel of the firebox, such that, in the portable configuration, the cover is received between the front panel and the rear panel of the firebox, and the grate can be located on the open top of the firebox, between the firebox and the cover when combined in the portable configuration.

10. Barbecue according to claim 8, wherein the firebox and the left side panel and the right side panel of the cover are provided with a tab in slot connection which, in the barbeque configuration, couples the cover with the firebox, and wherein the slots of the firebox for receiving the tabs of the cover are provided in the bottom panel within the substantially U-shaped side sections.

11. Barbecue according to claim 10, wherein the free end of each side panel of the cover is provided with a support surface and at least one tab, which at least one tab extends at an angle to the side panel of the cover and, when in the cover is coupled with the firebox, extends substantially parallel to a bottom surface of the bottom panel of the firebox, and
which support surface is spaced from the tab at a distance substantially similar to the thickness of the bottom panel of the firebox, such that, when in the cover is coupled with the firebox, the bottom panel is locked between the support surface and the tab, and movement of the firebox relative to the cover in a direction parallel to the side panels of the cover is prevented.

12. Barbecue according to claim 1, wherein the cover is folded from a single blank of sheet metal.

13. Barbecue according to claim 1, wherein the front panel the bottom panel and the rear panel of the firebox are folded from a single blank of sheet metal.

14. Barbecue according to claim 1, wherein the firebox is provided with a grip, mounted with opposite ends to the front panel and the rear panel of the firebox.

15. Barbecue according to claim 1, wherein the grate is configured to rest on the left side panel and the right side panel of the firebox, and
is provided with spacer walls extending substantially perpendicular to the food support surface, which spacer walls are provided with slots, or are spaced relative to each other, such that the spacer walls enable the grate to be mounted onto the firebox in a raised position, in which the spacer walls rest upon the side panels and/or front panel and rear panel of the firebox, and in a lowered position, in which the side panels and/or front panel and rear panel of the firebox are received in slot and/or spaces respectively provided in or between the spacer walls.

16. Barbecue according to claim 1, wherein the grate is provided with skewer side walls on opposites sides of the grate, which skewer side walls extend substantially perpendicular to the food support surface, and which skewer side walls are provided with skewer slots for receiving a skewer, such that the skewer side walls can support that skewer at a distance above the food support surface of the grate.

17. Barbecue according to claim 1, wherein the front panel and the rear panel of the firebox extend above the left side panel and the right side panel of the firebox, such that the cover, more in particular the top panel of the cover, when in the portable configuration, is received between the front panel and the rear panel of the firebox.

18. Barbecue according to claim 2, wherein the cover is configured to, in the portable configuration, be coupled with the firebox at the free ends of its left side panel and right side panel.

19. Portable barbecue, the portable barbeque comprising:
a firebox for holding embers, a grate for supporting food products to be barbecued above the embers, and a cover for said firebox,
wherein the firebox has a bottom panel, a front panel, a rear panel, a left side panel and a right side panel, which panels together form the firebox, the firebox having an open top,
wherein the grate has a food product support surface, which support surface is provided with a pattern of apertures, and which grate is configured to be mounted over the open top of the firebox,
wherein the cover has a top panel, a left side panel and a right side panel, which side panels are provided at opposite ends of the top panel, such that the cover is substantially U-shaped in a frontal view, and which left side panel and right side panel are spaced for receiving the firebox between them,
wherein the firebox and the cover are adapted to be coupled in a portable configuration, in which the cover functions as a cover of the firebox, and in a barbecue configuration, in which the cover functions as a stand of the firebox,
in which portable configuration the cover is mounted onto the firebox such that the top panel of the cover covers the open top of the firebox, and the left side panel and the right side panel of the cover extend along the left panel and the right panel of the firebox, and in which barbeque configuration, the firebox is mounted onto the cover, such that the cover forms a stand for the firebox, and the left side panel and the right side panel of the cover vertically space the firebox at a distance from a support surface, and
wherein the cover is configured to, in the portable configuration, be coupled with the firebox at the free ends of its left side panel and right side panel.

20. Portable barbecue, the portable barbeque comprising:
a firebox for holding embers, a grate for supporting food products to be barbecued above the embers, and a cover for said firebox,
wherein the firebox has a bottom panel, a front panel, a rear panel, a left side panel and a right side panel, which panels together form the firebox, the firebox having an open top,
wherein the grate has a food product support surface, which support surface is provided with a pattern of apertures, and which grate is configured to be mounted over the open top of the firebox,
wherein the cover has a top panel, a left side panel and a right side panel, which side panels are provided at opposite ends of the top panel, such that the cover is substantially U-shaped in a frontal view, and which left side panel and right side panel are spaced for receiving the firebox between them,
wherein the firebox and the cover are adapted to be coupled in a portable configuration, in which the cover functions as a cover of the firebox, and in a barbecue configuration, in which the cover functions as a stand of the firebox,
in which portable configuration the cover is mounted onto the firebox such that the top panel of the cover covers the open top of the firebox, and the left side panel and the right side panel of the cover extend along the left panel and the right panel of the firebox, and
in which barbeque configuration, the firebox is mounted onto the cover, such that the cover forms a stand for the firebox, and the left side panel and the right side panel of the cover vertically space the firebox at a distance from a support surface, and
wherein the front panel and the rear panel of the firebox extend above the left side panel and the right side panel of the firebox, such that the cover, when in the portable configuration, is received between the front panel and the rear panel of the firebox.

\* \* \* \* \*